US006387965B1

(12) United States Patent
Benko et al.

(10) Patent No.: US 6,387,965 B1
(45) Date of Patent: *May 14, 2002

(54) SURFACE DEVULCANIZATION OF CURED RUBBER CRUMB

(75) Inventors: David Andrew Benko, Munroe Falls; Roger Neil Beers, Uniontown, both of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/711,799

(22) Filed: Nov. 13, 2000

Related U.S. Application Data

(60) Provisional application No. 60/193,223, filed on Mar. 30, 2000.

(51) Int. Cl.[7] ................................................. C08J 11/04
(52) U.S. Cl. ........................................... 521/41; 521/44
(58) Field of Search ........................... 521/40, 40.5, 41, 521/43.5, 44, 49.5

(56) References Cited

U.S. PATENT DOCUMENTS

| 4,104,205 A | 8/1978 | Novotny et al. ............. 260/2.3 |
| 5,284,625 A | 2/1994 | Isayev et al. ................ 422/128 |
| 5,602,186 A | 2/1997 | Myers et al. .................. 521/41 |
| 5,798,394 A | * 8/1998 | Myers et al. ............... 521/42.5 |
| 5,891,926 A | 4/1999 | Hunt et al ..................... 521/41 |
| 5,998,490 A | * 12/1999 | Serkiz ........................... 521/41 |

* cited by examiner

Primary Examiner—Edward J. Cain
Assistant Examiner—Katarzyna W. Lee
(74) Attorney, Agent, or Firm—Alvin T. Rockhill

(57) ABSTRACT

This invention discloses a process for devulcanizing the surface of reclaimed rubber crumb into surface devulcanized reclaimed rubber crumb that is suitable for being recompounded and recured into high performance rubber products, said process comprising the steps of (1) heating the reclaimed rubber crumb to a temperature which is within the range of about 150° C. to about 300° C. under a pressure of at least about $3.4 \times 10^6$ Pascals in the presence of a solvent selected from the group consisting of alcohols and ketones, wherein said solvent has a critical temperature, which is within the range of about 200° C. to about 350° C., to devulcanize the surface of the rubber crumb thereby producing a slurry of the surface devulcanized reclaimed rubber crumb in the solvent, wherein the reclaimed rubber crumb has a particle size which is within the range of about 325 mesh to about 20 mesh, and (2) separating the surface devulcanized reclaimed rubber crumb from the solvent.

18 Claims, No Drawings

SURFACE DEVULCANIZATION OF CURED RUBBER CRUMB

This application is a provisional 60/193,223 filed Mar. 30, 2000.

BACKGROUND OF THE INVENTION

After they have been worn-out during their limited service life, millions of used tires, hoses, belts and other rubber products are discarded annually. These used rubber products are typically discarded and hauled to a dump because there is very little use for them after they have served their original intended purpose. A limited number of used tires are utilized in building retaining walls as guards for protecting boats and in other similar applications. However, the number of worn-out tires that need to be disposed of annually far exceeds the demand for them in these types of applications.

The recycling of cured rubber products has proven to be an extremely challenging problem. This problem associated with recycling cured rubber products arises because, in the vulcanization process, the rubber becomes crosslinked with sulfur. After vulcanization, the crosslinked rubber becomes thermoset and cannot be reformed into other products. In other words, the cured rubber cannot be melted and reformed into other products like metals or thermoplastic materials. Thus, cured rubber products cannot be simply melted and recycled into new products.

Since the discovery of the rubber vulcanization process by Charles Goodyear in the nineteenth century, there has been interest in the recycling of cured rubber. A certain amount of cured rubber from tires and other rubber products is shredded or ground to a small particle size and incorporated into various products as a type of filler. For instance, ground rubber can be incorporated in small amounts into asphalt for surfacing roads or parking lots. Small particles of cured rubber can also be included in rubber formulations for various rubber products that do not have high performance requirements. For instance, reclaimed rubber can be ground and compounded into formulations for floor mats or tire-turf for playgrounds. However, it should be understood that the recycled rubber serves only in the capacity of a filler because it was previously cured and does not co-cure to an appreciable extent with the virgin rubber in the rubber formulation.

Various techniques for devulcanizing cured rubber have been developed. Devulcanization offers the advantage of rendering the rubber suitable for being reformulated and recured into new rubber articles if it can be carried out without degradation of the rubber. The recycled rubber could again be used for its original intended purpose rather than simply as a filler. In other words, the devulcanized reclaimed rubber could again be used at higher levels in applications where there are high performance requirements; such as, in manufacturing tires, hoses and belts. The large scale commercial implementation of such a devulcanization technique could potentially be used to recycle vast quantities of worn-out tires and other rubber products that are currently being discarded to landfills. However, to the present time, no devulcanization technique has proven to be commercially viable on a large scale.

U.S. Pat. No. 4,104,205 discloses a technique for devulcanizing sulfur-vulcanized elastomer containing polar groups which comprises applying a controlled dose of microwave energy of between 915 MHz and 2450 MHz and between 41 and 177 watt-hours per pound in an amount sufficient to sever substantially all carbon-sulfur and sulfur—sulfur bonds and insufficient to sever significant amounts of carbon—carbon bonds.

U.S. Pat. No. 5,284,625 discloses a continuous ultrasonic method for breaking the carbon-sulfur, sulfur—sulfur and, if desired, the carbon—carbon bonds in a vulcanized elastomer. Through the application of certain levels of ultrasonic amplitudes in the presence of pressure and optionally heat, it is reported that cured rubber can be broken down. Using this process, the rubber becomes soft, thereby enabling it to be reprocessed and reshaped in a manner similar to that employed with previously uncured elastomers.

U.S. Pat. No. 5,602,186 discloses a process for devulcanizing cured rubber by desulfurization, comprising the steps of contacting rubber vulcanizate crumb with a solvent and an alkali metal to form a reaction mixture, heating the reaction mixture in the absence of oxygen and with mixing to a temperature sufficient to cause the alkali metal to react with sulfur in the rubber vulcanizate and maintaining the temperature below that at which thermal cracking of the rubber occurs, thereby devulcanizing the rubber vulcanizate. U.S. Pat. No. 5,602,186 indicates that it is preferred to control the temperature below about 300° C., or where thermal cracking of the rubber is initiated.

U.S. Pat. No. 5,891,926 discloses a process for devulcanizing cured rubber into devulcanized rubber that is capable of being recompounded and recured into useful rubber products, and for extracting the devulcanized rubber from the cured rubber, said process comprising (1) heating the cured rubber to a temperature which is within the range of about 150° C. to about 300° C. under a pressure of at least about $3.4 \times 10^6$ Pascals in 2-butanol to devulcanize the cured rubber into the devulcanized rubber thereby producing a mixture of solid cured rubber, solid devulcanized rubber and a solution of the devulcanized rubber in the 2-butanol, (2) removing the solution of the devulcanized rubber from the solid cured rubber and the solid devulcanized rubber, (3) cooling the solution of the devulcanized rubber in the 2-butanol to a temperature of less than about 100° C. and (4) separating the devulcanized rubber from the 2-butanol.

SUMMARY OF THE INVENTION

This invention is directed to a commercially viable technique for recycling large quantities cured rubber from reclaimed rubber articles. The technique of this invention involves grinding the reclaimed rubber to a particle size which is within the range of about 325 mesh to about 20 mesh and then devulcanizing the surface of reclaimed rubber crumb. It has been unexpectedly found that, by doing so, the surface devulcanized reclaimed rubber can be blended into and co-cured with virgin rubber. This offers a tremendous commercial advantage in that it is only necessary to devulcanize the rubber on the surface of the reclaimed rubber crumb. Thus, the cost of the devulcanization procedure is only a fraction of the cost associated with devulcanizing the total quantity of reclaimed rubber being recycled.

The surface devulcanized reclaimed rubber of this invention can be used in manufacturing rubber articles that demand high performance characteristics (such as, tires, hoses and belts) when blended with virgin rubbers in quantities of up to about 40 phr. In fact, such blends of the surface devulcanized reclaimed rubber with virgin elastomers have cure properties and tensile properties that are comparable to blends made with totally virgin materials.

By utilizing the process of this invention, the surface of cured rubber crumb can be devulcanized using a simple technique without the need for microwaves, ultrasonic waves or an alkali metal. In other words, the surface of the cured rubber crumb can be devulcanized in the absence of microwaves, ultrasonic waves or an alkali metal. The employment of the process of this invention also preserves the original microstructure of the rubber and allows for it to maintain a relatively high molecular weight. Thus, the process of this invention primarily breaks sulfur—sulfur bonds and/or carbon-sulfur bonds rather than carbon—carbon bonds. The surface devulcanized reclaimed rubber can accordingly be used in the same types of applications as was the original rubber.

This invention more specifically discloses a process for devulcanizing the surface of reclaimed rubber crumb into surface devulcanized reclaimed rubber crumb that is suitable for being recompounded and recured into high performance rubber products, said process comprising the steps of (1) heating the reclaimed rubber crumb to a temperature which is within the range of about 150° C. to about 300° C. under a pressure of at least about $3.4 \times 10^6$ Pascals in the presence of a solvent selected from the group consisting of alcohols and ketones, wherein said solvent has a critical temperature which is within the range of about 200° C. to about 350° C., to devulcanize the surface of the rubber crumb thereby producing a slurry of the surface devulcanized reclaimed rubber crumb in the solvent, wherein the reclaimed rubber crumb has a particle size which is within the range of about 325 mesh to about 20 mesh, and (2) separating the surface devulcanized reclaimed rubber crumb from the solvent.

This invention also reveals a surface devulcanized reclaimed rubber crumb that is suitable for being recompounded and recured into high performance rubber products, said surface devulcanized reclaimed rubber crumb being comprised of a core and an outer shell, wherein the core is comprised of a cured rubber, and wherein the outer shell is comprised of a devulcanized rubber.

The present invention further discloses a rubber blend that can be used in manufacturing high performance rubber products, said blend being comprised of (a) about 10 phr to about 40 phr of a surface devulcanized reclaimed rubber crumb, wherein said surface devulcanized reclaimed rubber crumb is comprised of a core and an outer shell, wherein the core is comprised of a cured rubber and wherein the outer shell is comprised of a devulcanized rubber, and (b) about 60 phr to about 90 phr of a sulfur-curable virgin rubber.

This invention also reveals a high performance rubber article comprised of a cured blend of (a) about 10 phr to about 40 phr of a surface devulcanized reclaimed rubber crumb, wherein said surface devulcanized reclaimed rubber crumb is comprised of a core and an outer shell, wherein the core is comprised of a cured rubber and wherein the outer shell is comprised of a devulcanized rubber, and (b) about 60 phr to about 90 phr of a sulfur-curable virgin rubber.

The present invention also discloses a tire which is comprised of a generally toroidal-shaped carcass with an outer circumferential tread, two spaced beads, at least one ply extending from bead to bead and sidewalls extending radially from and connecting said tread to said beads; wherein said tread is adapted to be ground-contacting; and wherein the tread is comprised of a cured blend of (a) about 10 phr to about 30 phr of a surface devulcanized reclaimed rubber crumb, wherein said surface devulcanized reclaimed rubber crumb is comprised of a core and an outer shell, wherein the core is comprised of a cured rubber and wherein the outer shell is comprised of a devulcanized rubber, and (b) about 70 phr to about 90 phr of a sulfur-curable virgin rubber.

DETAILED DESCRIPTION OF THE INVENTION

The surface of virtually any type of sulfur-cured rubber crumb can be devulcanized by utilizing the process of this invention. For instance, it can be used to devulcanize natural rubber, synthetic polyisoprene rubber, polybutadiene rubber, styrene-butadiene rubber, isoprene-butadiene rubber, styrene-isoprene rubber, styrene-isoprene-butadiene rubber, nitrile rubber, carboxylated nitrile rubber, bromobutyl rubber, chlorobutyl rubber and the like. The technique of this invention can also be used to devulcanize blends of various types of rubbers. In fact, tires and most other rubber articles are typically made using blends of various elastomers. Thus, the reclaimed rubber crumb treated by the process of this invention will usually be a blend of various rubbers having the same composition as its source. In other words, it will be a blend having the composition of the tires, hoses, belts and other rubber articles used as the source of the reclaimed rubber.

It is critical for the rubber crumb treated by the process of this invention to first be reduced to a particle size which is within the range of about 325 mesh (44 microns) to about 20 mesh (840 microns). This can be accomplished by any mechanical means that will result in the particle size of the crumb rubber being reduced to be within the desired size range. For instance, the reclaimed rubber can be ground, cut or chopped to the desired particle size. It is normally preferred for the reclaimed rubber crumb to have a particle size which is within the range of about 100 mesh (149 microns) about 40 mesh (420 microns). It is typically most preferred for the reclaimed rubber crumb particles to have a particle size of about 60 mesh (250 microns) to about 40 mesh (about 420 microns).

If the particle size of the surface devulcanized reclaimed rubber crumb made by the technique of this invention is larger than about 20 mesh (840 microns), it will compromise the physical properties of products manufactured therewith. Thus, it would not be suitable for use in manufacturing high performance rubber products; such as, tires, hoses or power transmission belts. On the other hand, the large scale commercial benefit of the present invention is reduced as the particle size of the reclaimed rubber crumb is reduced. This is because the benefit of devulcanizing only the surface of the reclaimed rubber crumb is lost as particle size is reduced. This is, of course, because the ratio of the volume of the core of the crumb rubber particles (which are not devulcanized) to the volume of the shell of the crumb rubber particles (which are devulcanized) is reduced. Thus, a higher percentage of the reclaimed rubber is devulcanized at smaller particle sizes which is detrimental from an economic standpoint. At particle sizes of less than about 325 mesh (44 microns), the economic benefits of the technique of this invention are believed to be lost because virtually the total quantity of the crumb rubber is devulcanized rather than just its surface.

The surface devulcanization process of this invention can be carried out by simply heating the cured reclaimed rubber crumb in the presence of an alcohol and/or a ketone having a critical temperature which is within the range of about 200° C. to about 350° C. to a temperature of at least about 150° C. under a pressure of at least about $3.4 \times 10^6$ Pascals (Pa). It is normally preferred for the temperature to be no more than about 300° C. to minimize the level of polymer degradation. In other words, if the devulcanization process is conducted at a temperature of no more than about 300° C., the sulfur—sulfur and/or carbon-sulfur bonds in the cured rubber can be broken preferentially to the carbon—carbon bonds in the rubber. Thus, by carrying out the devulcanization process at a temperature of 300° C. or less, the molecular weight of the rubber can be maintained at a high level. For this reason, the devulcanization process will typically be conducted at a temperature that is within the range of about 150° C. to about 300° C.

It is normally preferred for the devulcanization process to be carried out at a temperature that is within the range of about 200° C. to about 280° C. The most preferred devulcanization temperatures are within the range of about 240° C. to about 270° C. The pressure employed will typically be within the range of about $3.4 \times 10^6$ Pascals (500 lbs/in2) to about $3.4 \times 10^7$ Pascals (5000 lbs/in2). It is normally preferred to utilize a pressure which is within the range of about $6.9 \times 10^6$ Pascals (1000 lbs/in2) to about $2.8 \times 10^7$ Pascals (4000 lbs/in2). It is generally most preferred to utilize a pressure which is within the range of about $1.7 \times 10^7$ Pascals (2500 lbs/in2) to about $2.4 \times 10^7$ Pascals (3500 lbs/in2). It is normally preferred for the cured rubber being devulcanized to be emersed in a bath of solvent. In any case, it is important to protect the devulcanized rubber from oxygen during the time that it is at an elevated temperature. In some cases, it will be desirable to conduct the process under an inert gas atmosphere, such as nitrogen.

The alcohol or ketone employed as the solvent will have a critical temperature that is within the range of about 200° C. to about 350° C. It is preferred for the alcohol or the ketone used as the solvent to have a critical temperature that is within the range of about 250° C. to about 320° C. The term "critical temperature" as used herein is defined as the temperature above which the gas of a compound (the alcohol or the ketone) cannot be liquefied by the application of pressure. Some representative examples of alcohols that can be used include methanol, ethanol, allyl alcohol, 1-propanol, isopropyl alcohol, n-butanol, iso-butanol, 2-butanol, tert-butanol, 1-pentanol, 2-methyl-1-butanol, 3-methyl-1-butanol, 3-methyl-2-butanol, 2,2-dimethyl-1-propanol, methyl isobutyl ketone, and 1-hexanol. Some representative examples of ketones that can be used include acetone, methyl ethyl ketone, methyl n-propyl ketone, methyl iso-propyl ketone, and diethyl ketone. Mixtures of such alcohols and ketones can be utilized as the solvent.

The rubber crumb will be subjected to the devulcanization for a period of time that is sufficient to substantially devulcanize the shell of the crumb particles without devulcanizing the rubber in the core of the crumb particles. The optimal amount of time required to devulcanization the surface of the rubber crumb particles is dependant upon the temperature, the pressure and the particle size of the rubber crumb. However, the devulcanization time will typically be within the range of about 1 minute to about 60 minutes. The devulcanization will typically be carried out over a period of about 5 minutes to about 40 minutes. The devulcanization will more commonly be carried out over a period of about 10 minutes to about 30 minutes.

After the devulcanization has been completed, the surface devulcanized reclaimed rubber crumb is separated from the solvent. Since the devulcanized rubber is somewhat soluble in the solvent at elevated temperatures, the separation will typically be carried out at a temperature of less than about 100° C. The surface devulcanized reclaimed rubber crumb can be recovered from the solvent utilizing conventional techniques for separating solids from liquids. For instance, decantation, filtration, centrification or a similar technique can be used to recover the surface devulcanized reclaimed rubber crumb and other solid residue (such as, carbon black, silica, clay and metals from the solvent).

The surface devulcanized reclaimed rubber made by the process of this invention can then be recompounded and recured into high performance rubber products; such as, tires, hoses and belts. The weight average molecular weight of the rubber can be maintained at a high level of over 100,000 and typically over 150,000. In some cases, a weight average molecular weight of over 200,000 can be maintained. The devulcanization technique of this invention does not significantly change the microstructure of the rubber and it can accordingly be used in the same types of applications as was the original rubber. In other words, the devulcanized rubber can be recompounded and recured into useful articles in substantially the same way as was the original rubber.

The surface devulcanized reclaimed rubber crumb is comprised of a core and an outer shell. The rubber in the outer shell of the crumb rubber particles will be devulcanized by the technique of this invention. Thus, the rubber in the shell of the surface devulcanized rubber crumb will be capable of again being cured with sulfur. The surface devulcanized reclaimed rubber crumb is accordingly capable of being cocured with virgin elastomers. However, the rubber in the core of the surface devulcanized reclaimed rubber crumb is a cured rubber. The surface devulcanized reclaimed rubber crumb of this invention is useful in blends with other elastomers at any ratio of volume of the devulcanized shell to volume of the cured core. However, for economic reasons, it is desirable to minimize the volume of the devulcanized outer shell and maximize the volume of the cured core.

Rubber compounds that contain up to about 40 phr (arts per hundred parts by weight of rubber) of the surface devulcanized reclaimed rubber crumb of this invention can be made and utilized in manufacturing high performance rubber products. In most cases, about 10 phr to about 40 phr of the surface devulcanized reclaimed rubber will be blended with about 60 phr to about 90 phr of one or more virgin elastomers. The virgin elastomer can be virtually any type of rubbery polymer other than reclaimed rubber. For instance, the virgin rubber can be natural rubber, synthetic polyisoprene rubber, polybutadiene rubber, styrene-butadiene rubber, isoprene-butadiene rubber, styrene-isoprene rubber, styrene-isoprene-butadiene rubber, nitrite rubber, carboxylated nitrite rubber, bromobutyl rubber or chlorobutyl rubber.

The surface devulcanized reclaimed rubber will typically be employed in such blends at a level of about 15 phr to about 35 phr. It is normally preferred for the surface devulcanized reclaimed rubber to be present in such blends at a level of about 20 phr to about 30 phr. It is generally more preferred for the surface devulcanized reclaimed rubber to be present in such blends at a level of about 25 phr to about 30 phr.

A preferred use for the surface devulcanized reclaimed rubber is in making tire tread rubber compounds. Such tire tread compounds will typically be comprised of (a) about 10 phr to about 30 phr of a surface devulcanized reclaimed rubber crumb, wherein said surface devulcanized reclaimed rubber crumb is comprised of a core and an outer shell, wherein the core is comprised of a cured rubber and wherein the outer shell is comprised of a devulcanized rubber, and (b) about 70 phr to about 90 phr of a sulfur-curable virgin rubber. The sulfur-curable virgin rubber will typically be natural rubber, synthetic polyisoprene rubber, polybutadiene rubber, styrene-butadiene rubber, isoprene-butadiene rubber, styrene-isoprene rubber, styrene-isoprene-butadiene rubber or a blend thereof. It is normally preferred for the surface devulcanized reclaimed rubber to be present at a level of 20 phr to 30 phr and it is most preferred for the surface devulcanized reclaimed rubber to be present at a level of 25 phr to about 30 phr.

This invention is illustrated by the following examples which are merely for the purpose of illustration and are not to be regarded as limiting the scope of the invention or the manner in which it can be practiced. Unless specifically indicated otherwise, parts and percentages are given by weight.

COMPARATIVE EXAMPLES 1–10

In this series of experiments, cured styrene-butadiene rubber (SBR) containing 23.5 percent bound styrene was devulcanized in various alcohols, including methanol, ethanol, 1-butanol, 1-propanol, 2-propanol, 2-butanol, isobutyl alcohol, 4-methyl-2-pentanol and 1-pentanol. The alcohol was injected into a Hewlett-Packard 5890A gas chromatograph at a pressure of $2.1 \times 10^7$ Pascals (3000 lbs/in2) with an ISCO LC-5000 syringe pump. The Hewlett-Packard 5890A gas chromatograph was not used in the capacity of a chromatographic instrument. The chromatograph was used solely to provide a temperature controllable environment. In other words, the chromatograph was used in the capacity of a heating oven. The sample vessel in the gas chromatograph contained about 0.55 grams of cured SBR samples which were devulcanized and extracted by the alcohol that passed through the sample vessel which was inline with an all-metal flow path.

In the procedure used, the SBR samples were initially heated to a temperature of 150° C. and maintained at that temperature under static conditions for 10 minutes in the alcohol which was, of course, under the pressure of $2.1 \times 10^7$ Pascals (3000 lbs/in2).

Then, the alcohol was allowed to flow through the system at a flow rate of 1–2 ml per minute at a temperature of 150° C. for 20 minutes with the alcohol exiting the chromatograph being collected and the amount of devulcanized SBR that was extracted being measured.

Then, the temperature of the sample chamber was increased to 200° C. and was maintained at that temperature under static conditions for 10 additional minutes with the alcohol still being maintained at a pressure of $2.1 \times 10^7$ Pascals (3000 lbs/in2). Then, the alcohol was again allowed to flow through the system at a flow rate of 1–2 ml per minute at a temperature of 200° C. for 20 minutes with the alcohol exiting the chromatograph being collected and with the amount of devulcanized SBR that was extracted being measured.

Then, the temperature of the sample chamber was increased to 250° C. and was maintained at that temperature under static conditions for 10 additional minutes with the alcohol being maintained at a pressure of $2.1 \times 10^7$ Pascals (3000 lbs/in2). Then, the alcohol was again allowed to flow through the system at a flow rate of 1–2 ml per minute at a temperature of 250° C. for 20 minutes with the alcohol exiting the chromatograph being collected and with the amount of devulcanized SBR extracted by the alcohol being measured.

Finally, the temperature of the sample chamber was increased to 300° C. and was maintained at that temperature under static conditions for 10 additional minutes with the alcohol being maintained at a pressure of $2.1 \times 10^7$ Pascals (3000 lbs/in2). Then, the alcohol was again allowed to flow through the system at a flow rate of 1–2 ml per minute at a temperature of 300° C. for 20 minutes with the alcohol exiting the chromatograph being collected and with the amount of devulcanized SBR extracted by the alcohol being measured.

The cumulative percentage of devulcanized SBR that was extracted from the cured SBR sample with each of the alcohols evaluated at 150° C., 200° C., 250° C. and 300° C. is reported in Table I. Example 2 is a repeat of Example 1. Examples 3–10 are examples where alcohols other than 2-butanol were used for the devulcanization.

TABLE I

| Example | Alcohol | 150° C. | 200° C. | 250° C. | 300° C. |
|---|---|---|---|---|---|
| 1 | 2-butanol | 38% | 82% | 90% | 93% |
| 2 | 2-butanol | 40% | 70% | 85% | 92% |
| 3 | methanol | 2% | 3% | 4% | 7% |
| 4 | ethanol | 2% | 4% | 9% | 20% |
| 5 | 1-propanol | 3% | 16% | 43% | 69% |
| 6 | 2-propanol | 2% | 7% | 13% | 25% |
| 7 | 1-butanol | 4% | 19% | 57% | 86% |
| 8 | isobutyl alcohol | 2% | 10% | 44% | 74% |
| 9 | 1-pentanol | 3% | 11% | 42% | 89% |
| 10 | 4-methyl-2-pentanol | 2% | 11% | 33% | 68% |

As can be seen from Table I, all of the alcohols evaluated devulcanized the rubber to some extent. However, the 2-butanol was far better than any of the other alcohols evaluated. It was particularly superior at lower temperatures. In fact, at 200° C., it extracted at least 70 percent of the SBR and, at 250° C., it extracted at least 85 percent of the SBR. The utilization of lower temperatures is, of course, desirable because less polymer degradation occurs at lower temperatures. The devulcanized SBR samples that were extracted were determined to have the same microstructure as the original SBR samples.

EXAMPLES 11–20

In this series of experiments, the general procedure utilized in Examples 1–10 was repeated except that temperature was held constant at 250° C. and the alcohol was allowed to flow continuously at a rate of 1–2 ml per minute for 20 minutes at pressure. In this series of experiments, 2-butanol was used exclusively as the alcohol for the devulcanizations. Cured SBR samples that contained no filler, carbon black, silica or a combination of carbon black and silica were devulcanized and extracted with the 2-butanol. The SBR had an original weight average molecular weight of about 400,000. The weight average molecular weights of the devulcanized SBR samples recovered are reported in Table II.

TABLE II

| Example | Filler | Molecular weight* |
|---|---|---|
| 11 | no filler | 181,000 |
| 12 | no filler | 186,000 |
| 13 | silica | 244,000 |
| 14 | silica | 293,000 |
| 15 | carbon black | 197,000 |
| 16 | carbon black | 216,000 |
| 17 | carbon black/silica | 177,000 |
| 18 | carbon black/silica | 177,000 |

*The molecular weights reported are weight average molecular weights.

As can be seen from Table II, the devulcanize technique could be used for rubber samples that contained silica, carbon black or a combination of silica and carbon black. Table II also shows that the devulcanization technique did not greatly reduce the molecular weight of the rubber. Thus, the devulcanization procedure destroyed sulfur—sulfur bonds and/or carbon-sulfur bonds without destroying a significant number of carbon—carbon bonds in the rubber.

EXAMPLES 19–28

In this series of experiments, whole tire reclaim rubber was ground to a particle size of 40 mesh (about 420 microns) and the surface of the ground crumb rubber was then devulcanized. The surface devulcanization was carried out in 2-butanol under the conditions of time, pressure and temperature specified in Table III. Then, the samples of surface devulcanized reclaimed rubber made were analyzed to determine the volatile content and the polymer content. The results of this analysis is also reported in Table III along with the analysis of a control that was not subjected to the devulcanization procedure.

TABLE III

| Example | Temp. (° C.) | Pressure (psig) | Time (min) | Volatiles (%) | Polymer (%) |
|---|---|---|---|---|---|
| 19 | 270 | 900 | 20 | 41.61 | 11.8 |
| 20 | 270 | 900 | 40 | 38.75 | 9.16 |
| 21 | 270 | 1500 | 20 | 15.06 | 31.24 |
| 22 | 270 | 1500 | 40 | 21.36 | 23.07 |
| 23 | 300 | 900 | 20 | 38.09 | 18.54 |
| 24 | 300 | 900 | 40 | 46.08 | 10.96 |
| 25 | 300 | 1500 | 20 | 36.78 | 16.58 |
| 26 | 300 | 1500 | 40 | 37.44 | 7.28 |
| 27 | 285 | 1200 | 30 | 35.77 | 19.56 |
| 28 | 285 | 1200 | 30 | 36.68 | 20.23 |
| Control | | | | 12.26 | 53.28 |

As can be seen from Table III, the samples of crumb rubber were devulcanized. The level of volatiles was much higher in Examples 19–28 than in the control. The polymer content of the crumb rubber samples was also greatly reduced from the level in the control.

The samples of surface devulcanized reclaimed rubber made in this series of experiments were then compounded with a blend of virgin rubbers and cured. The blends were made by mixing 20 phr of the surface devulcanized reclaimed rubber samples with 70 phr of Plioflex® 1712 styrene-butadiene rubber, 30 phr of Budene® 1254 polybutadiene rubber, about 9 phr of aromatic oil, about 70 phr of carbon black, about 2 phr of stearic acid, about 4 phr of wax, about 1 phr of accelerator, about 2 phr of zinc oxide, about 1.5 phr of sulfur and about 1 phr of antioxidant. The Plioflex® 1712 has a bound styrene content of about 28.5 percent and was oil-extended with about 37.5 percent of an aromatic oil. The blends were then cured at 150° C. for 20 minutes. The cure properties of the blends is reported in Table IV and the physical properties of the cured blends are reported in Table V.

TABLE IV

| Example | Torque | Ts1 (min) | T25 (min) | T90 (min) |
|---|---|---|---|---|
| 19 | 17 | 7.3 | 9.1 | 18.5 |
| 20 | 18.2 | 7 | 8.7 | 16.7 |
| 21 | 16.3 | 7 | 9 | 19 |
| 22 | 16.3 | 7 | 8.7 | 19.5 |
| 23 | 16.4 | 6.7 | 8.3 | 17.7 |
| 24 | 16.9 | 6.8 | 8.4 | 19.5 |
| 25 | 18 | 6.5 | 8.3 | 18.5 |
| 26 | 17 | 6.5 | 8.1 | 17 |
| 27 | 17.5 | 6.5 | 8.2 | 16.5 |
| 28 | 16.6 | 6.8 | 8.6 | 19 |
| Original | 16.6 | 5.3 | 6.6 | 14.9 |
| None | 19 | 6.4 | 8.3 | 7.2 |

As can be seen from Table IV, the blends made with the surface devulcanized reclaimed rubber crumb did not have cure characteristics that differed substantially from the blend made without including any of the reclaimed rubber (the series labeled "None"). In fact, the blends made with the surface devulcanized reclaimed rubber crumb had cure characteristics that were more similar to those made with no ground rubber than they were to those made with untreated whole tire reclaim rubber (the series labeled "Original").

TABLE V

| Example | Tensile (MPa) | Elongation (%) | Modulus 100% | Modulus 300% |
|---|---|---|---|---|
| 19 | 15.4 | 747 | 1.23 MPa | 4.45 MPa |
| 20 | 15.3 | 701 | 1.33 MPa | 4.93 MPa |
| 21 | 13 | 775 | 1.10 MPa | 3.39 MPa |
| 22 | 13.7 | 798 | 1.11 MPa | 3.46 MPa |
| 23 | 15.1 | 814 | 1.09 MPa | 3.54 MPa |
| 24 | 15.2 | 778 | 1.11 MPa | 3.88 MPa |
| 25 | 16.1 | 764 | 1.19 MPa | 4.49 MPa |
| 26 | 15.4 | 738 | 1.21 MPa | 4.43 MPa |
| 27 | 15.2 | 789 | 1.13 MPa | 3.88 MPa |
| 28 | 14.8 | 791 | 1.11 MPa | 3.74 MPa |
| Original | 14.5 | 661 | 1.16 MPa | 4.1 MPa |
| None | 18.6 | 757 | 1.28 MPa | 4.93 MPa |

As can be seen from Table V, the physical properties of some of the cured blends made with the surface devulcanized reclaimed rubber crumb samples were equivalent to those made with only virgin rubber. For instance, the 100% Modulus, 300% Modulus and percent elongation measured in Examples 19 and 20 was very similar to those found in the control using only virgin rubber (the series labeled "None").

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A process for devulcanizing the surface of reclaimed rubber crumb into surface devulcanized reclaimed rubber crumb that is suitable for being recompounded and recured into high performance rubber products, said process comprising the steps of (1) heating the reclaimed rubber crumb to a temperature which is within the range of about 150° C. to about 300° C. under a pressure of at least about $3.4 \times 10^6$ Pascals in the presence of a solvent selected from the group consisting of alcohols and ketones, wherein said solvent has a critical temperature which is within the range of about 200° C. to about 350° C., to devulcanize the surface of the rubber crumb thereby producing a slurry of the surface devulcanized reclaimed rubber crumb in the solvent, wherein the reclaimed rubber crumb has a particle size which is within the range of about 325 mesh to about 20 mesh, and (2) separating the surface devulcanized reclaimed rubber crumb from the solvent.

2. A process as specified in claim 1 wherein step (1) is carried out at a pressure which is within the range of about $3.4 \times 10^6$ Pascals to about $3.4 \times 10^7$ Pascals.

3. A process as specified in claim 2 wherein step (1) is carried out at a temperature which is within the range of about 200° C. to about 280° C.

4. A process as specified in claim 3 wherein the reclaimed rubber crumb has a particle size which is within the range of about 100 mesh to about 40 mesh.

5. A process as specified in claim 1 wherein step (1) is carried out at a pressure which is within the range of about $6.9 \times 10^6$ Pascals to about $2.8 \times 10^7$ Pascals.

6. A process as specified in claim 5 wherein step (1) is carried out at a temperature which is within the range of about 240° C. to about 270° C.

7. A process as specified in claim 6 wherein the reclaimed rubber crumb has a particle size which is within the range of about 60 mesh to about 40 mesh.

8. A process as specified in claim 7 wherein step (1) is carried out at a pressure which is within the range of about $1.7 \times 10^7$ Pascals to about $2.4 \times 10^7$ Pascals.

9. A process as specified in claim 1 wherein the solvent is an alcohol.

10. A process as specified in claim 1 wherein the solvent is a ketone.

11. A process as specified in claim 9 wherein the alcohol has a critical temperature that is within the range of about 250° C. to about 320° C.

12. A process as specified in claim 10 wherein the ketone has a critical temperature that is within the range of about 250° C. to about 320° C.

13. A process as specified in claim 9 wherein the alcohol is selected from the group consisting of methanol, ethanol, allyl alcohol, 1-propanol, isopropyl alcohol, n-butanol, isobutanol, 2-butanol, tert-butanol, 1-pentanol, 2-methyl-1-butanol, 3-methyl-1-butanol, 3-methyl-2-butanol, 2,2-dimethyl-1-propanol, methyl isobutyl ketone, and 1-hexanol.

14. A process as specified in claim 10 wherein the ketone is selected from the group consisting of acetone, methyl ethyl ketone, methyl n-propyl ketone, methyl isopropyl ketone, and diethyl ketone.

15. A process as specified in claim 10 wherein the ketone is methyl ethyl ketone.

16. A process as specified in claim 4 wherein the solvent is methyl ethyl ketone.

17. A process as specified in claim 7 wherein the solvent is methyl ethyl ketone.

18. A process as specified in claim 8 wherein the solvent is methyl ethyl ketone.

* * * * *